(12) United States Patent
Herron

(10) Patent No.: US 7,076,631 B2
(45) Date of Patent: Jul. 11, 2006

(54) MECHANISM FOR ON-THE-FLY HANDLING OF UNALIGNED MEMORY ACCESSES

(75) Inventor: Phillip Stone Herron, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 645 days.

(21) Appl. No.: 10/412,854

(22) Filed: Apr. 14, 2003

(65) Prior Publication Data

US 2004/0202030 A1    Oct. 14, 2004

(51) Int. Cl.
    *G06F 12/00* (2006.01)
(52) U.S. Cl. .................................. 711/201; 712/244
(58) Field of Classification Search .................... None
    See application file for complete search history.

(56) References Cited

U.S. PATENT DOCUMENTS 6,772,372 B1 *  8/2004  McKee et al. ............. 714/42
6,898,697 B1 *  5/2005  Gao et al. .................. 712/229
2004/0098556 A1 *  5/2004  Buxton et al. ............. 711/201

\* cited by examiner

*Primary Examiner*—Pierre Vital
*Assistant Examiner*—Midys Rojas
(74) *Attorney, Agent, or Firm*—Allen, Dyer, Doppelt, Milbrath & Gilchrist, P.A.

(57) ABSTRACT

Unaligned accesses to memory are circumvented by an address exception handler mechanism, which decodes an exception-triggering instruction, and reads from or writes to, in a byte-by-byte manner, addressed portions of memory which are unaligned with an addressing scheme through which accesses to memory may be performed, and thereby give rise to unaligned memory access exceptions. The handler simulates the execution of the instruction with reference to an exception stack frame, to which the contents of all registers at the time of the unaligned address exception are saved. This allows the handler to controllably define values that are restored into registers during the processor's execution of a general exception vector. After handling the exception, program execution transitions to the next instruction that directly follows the exception-causing instruction.

20 Claims, 3 Drawing Sheets

| | |
|---|---|
| 601 | USE THE EPC TO DETERMINE THE EXCEPTING INSTRUCTION |
| 602 | DECODE THE INSTRUCTION |
| 603 | – LOAD WORD |
| 604 | – COPY 4 SEQUENTIAL BYTES FROM THE UNALIGNED ADDRESS TO THE DESTINATION REGISTER LOCATION ON THE EXCEPTION STACK FRAME |
| 605 | – INCREMENT THE EPC ON THE EXCEPTION STACK FRAME BY 4 TO POINT TO THE INSTRUCTION DIRECTLY FOLLOWING THE EXCEPTING INSTRUCTION |
| 611 | – LOAD HALFWORD SIGNED |
| 612 | – DEPENDING ON THE MOST SIGNIFICANT BIT OF THE HALFWORD, COPY 0x0000 OR 0xFFFF INTO THE UPPER 16 BITS OF THE DESTINATION REGISTER LOCATION ON THE EXCEPTION STACK FRAME |
| 613 | – COPY 2 SEQUENTIAL BYTES FROM THE UNALIGNED ADDRESS TO THE LOWER 16 BITS OF THE DESTINATION REGISTER LOCATION ON THE EXCEPTION STACK FRAME |
| 614 | – INCREMENT THE EPC ON THE EXCEPTION STACK FRAME BY 4 TO POINT TO THE INSTRUCTION DIRECTLY FOLLOWING THE EXCEPTING INSTRUCTION |
| 621 | – LOAD HALFWORD UNSIGNED |
| 622 | – COPY 0x0000 INTO THE UPPER 16 BITS OF THE DESTINATION REGISTER LOCATION ON THE EXCEPTION STACK FRAME |
| 623 | – COPY 2 SEQUENTIAL BYTES FROM THE UNALIGNED ADDRESS TO THE LOWER 16 BITS OF THE DESTINATION REGISTER LOCATION ON THE EXCEPTION STACK FRAME |
| 624 | – INCREMENT THE EPC ON THE EXCEPTION STACK FRAME BY 4 TO POINT TO THE INSTRUCTION DIRECTLY FOLLOWING THE EXCEPTING INSTRUCTION |

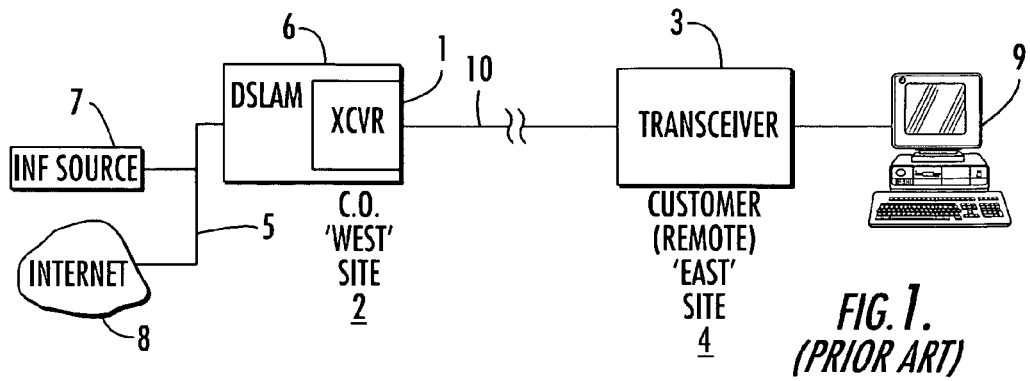

FIG. 5.

| | |
|---|---|
| SAVE PREVIOUS STACK POINTER AND PREPARE THE EXCEPTION STACK FRAME | 501 |
| SAVE REGISTERS TO THE EXCEPTION STACK FRAME | 502 |
| JUMP TO COMMON C EXCEPTION HANDLER (UMBRELLA FOR ALL EXCEPTIONS) | 503 |
| – DETERMINE THE EXACT CAUSE OF THE EXCEPTION | 504 |
| – HANDLE THE EXCEPTION | 505 |
| – RETURN TO THE GENERAL EXCEPTION VECTOR | 506 |
| RESTORE REGISTERS FROM THE EXCEPTION STACK FRAME | 507 |
| RESTORE PREVIOUS STACK POINTER | 508 |
| RETURN TO THE INSTRUCTION ADDRESS CONTAINED IN THE EPC | 509 |

FIG. 6.

| | |
|---|---|
| 601 | USE THE EPC TO DETERMINE THE EXCEPTING INSTRUCTION |
| 602 | DECODE THE INSTRUCTION |
| 603 | – LOAD WORD |
| 604 | – COPY 4 SEQUENTIAL BYTES FROM THE UNALIGNED ADDRESS TO THE DESTINATION REGISTER LOCATION ON THE EXCEPTION STACK FRAME |
| 605 | – INCREMENT THE EPC ON THE EXCEPTION STACK FRAME BY 4 TO POINT TO THE INSTRUCTION DIRECTLY FOLLOWING THE EXCEPTING INSTRUCTION |
| 611 | – LOAD HALFWORD SIGNED |
| 612 | – DEPENDING ON THE MOST SIGNIFICANT BIT OF THE HALFWORD, COPY 0x0000 OR 0xFFFF INTO THE UPPER 16 BITS OF THE DESTINATION REGISTER LOCATION ON THE EXCEPTION STACK FRAME |
| 613 | – COPY 2 SEQUENTIAL BYTES FROM THE UNALIGNED ADDRESS TO THE LOWER 16 BITS OF THE DESTINATION REGISTER LOCATION ON THE EXCEPTION STACK FRAME |
| 614 | – INCREMENT THE EPC ON THE EXCEPTION STACK FRAME BY 4 TO POINT TO THE INSTRUCTION DIRECTLY FOLLOWING THE EXCEPTING INSTRUCTION |
| 621 | – LOAD HALFWORD UNSIGNED |
| 622 | – COPY 0x0000 INTO THE UPPER 16 BITS OF THE DESTINATION REGISTER LOCATION ON THE EXCEPTION STACK FRAME |
| 623 | – COPY 2 SEQUENTIAL BYTES FROM THE UNALIGNED ADDRESS TO THE LOWER 16 BITS OF THE DESTINATION REGISTER LOCATION ON THE EXCEPTION STACK FRAME |
| 624 | – INCREMENT THE EPC ON THE EXCEPTION STACK FRAME BY 4 TO POINT TO THE INSTRUCTION DIRECTLY FOLLOWING THE EXCEPTING INSTRUCTION |

FIG. 7.

| | |
|---|---|
| 701 | USE THE EPC TO DETERMINE THE EXCEPTING INSTRUCTION |
| 702 | DECODE THE INSTRUCTION |
| 703 | – STORE WORD |
| 704 | – COPY 4 SEQUENTIAL BYTES FROM THE SOURCE REGISTER LOCATION ON THE EXCEPTION STACK FRAME TO THE UNALIGNED ADDRESSS |
| 705 | – INCREMENT THE EPC ON THE EXCEPTION STACK FRAME BY 4 TO POINT TO THE INSTRUCTION DIRECTLY FOLLOWING THE EXCEPTING INSTRUCTION |
| 711 | – STORE HALFWORD |
| 712 | – COPY 2 SEQUENTIAL BYTES FROM THE LEAST SIGNIFICANT 16 BITS OF THE SOURCE REGISTER LOCATION ON THE EXCEPTION STACK FRAME TO THE UNALIGNED ADDRESSS |
| 713 | – INCREMENT THE EPC ON THE EXCEPTION STACK FRAME BY 4 TO POINT TO THE INSTRUCTION DIRECTLY FOLLOWING THE EXCEPTING INSTRUCTION |

US 7,076,631 B2

MECHANISM FOR ON-THE-FLY HANDLING OF UNALIGNED MEMORY ACCESSES

FIELD OF THE INVENTION

The present invention relates in general to digital data transport systems and associated processing systems and methods therefor, and is particularly directed to an address exception handling methodology for reading from or writing to addressed portions of memory that are unaligned with the addressing scheme through which accesses to memory may be performed, and give rise to unaligned memory access exceptions.

BACKGROUND OF THE INVENTION

The ability to conduct high-speed data communications between relatively remote data processing systems and associated subsystems is currently a principal requirement of a variety of industries and applications, such as business, educational, medical, financial and personal computer users. Moreover, it can be expected that present and future applications of such communications will continue to engender more such systems and services. One technology that has attracted particular interest in the telecommunication community is digital subscriber line (DSL) service. DSL technology enables a public service telephone network (PSTN) to use existing telephone copper wiring infrastructure to deliver a relatively high data bandwidth digital communication service, that is selected in accordance with expected data transmission rate, the type and length of data transport medium, and schemes for encoding and decoding data.

FIG. 1 is a reduced complexity diagram of the general architecture of a DSL system, having mutually compatible digital communication transceivers 1 and 3, respectively installed at relatively remotely separated 'west' and 'east' sites 2 and 4, and coupled to a communication link 10, such as a twisted pair of an existing copper plant. One of these transceivers, for example, the west site transceiver 1, may be installed in a digital subscriber line access multiplexer (DSLAM) 6 of a network controller site (such as a telephone company central office (CO)). The DSLAM is coupled with an associated network backbone 5 that provides access to a number of information sources 7 and the Internet 8. As such, the west site transceiver 1 is used for the transport of digital communication signals, such as asynchronous transfer mode (ATM)-based packetized voice and data, from the central office site 2 over the communication link 10, to an integrated access device (IAD) serving as the DSL transceiver 3 at the east end of the link, and may be coupled with a computer 9 at a customer premises, such as a home or office.

An integrated access device is used to consolidate digitized data, voice and video traffic over a common wide area network (WAN) DSL link. This digitized voice stream may be encoded as mu-law or a-law voice samples, or it may comprise digitally encoded voice samples from an integrated services digital network (ISDN) phone. These digitally encoded voice samples are typically encapsulated in accordance with packet or cell protocol for transport over the network (for example, using voice over asynchronous transfer mode (ATM) or voice over internet protocol (IP)).

Because digital subscriber line transport systems of the type shown in FIG. 1 are customarily designed to provide as efficient use of the available bandwidth as possible, their major concern lies with parameters of the communication link, while secondarily they might address what takes place at an end user site that is interfaced with the link. At data terminal site, on the other hand, it is the performance of the data processing system that receives the principal emphasis. When these two subsystems are interfaced with one another, overall throughput efficiency may depend upon how well each is able to handle events that are characterized by protocols and data formats employed by the other subsystem.

One area where this problem occurs involves the manner in which data is encapsulated for transport over the communication link versus the way data is processed at the terminal site. Where the terminal site employs an embedded reduced instruction set computer (RISC)-based, data processing subsystem (such as but not limited to a 32-bit processor), it may encounter substantial throughput delays that result from an incoming (packetized) data stream creating unaligned accesses to memory. An unaligned memory access occurs when a central processing unit (CPU) read/load or write/store instruction references an address in memory, that does not conform to the natural or inherent alignment of the memory size, such as a 32-bit access for a (32-bit) word access, and a 16-bit access for a half-word access.

In a 32-bit system, a word access will be properly aligned with the natural memory addressing scheme, provided that the least two significant bits of the address are zero; for a half-word access to be naturally aligned, the least significant bit must equal zero. To illustrate this situation, FIG. 2 shows a reduced complexity diagram of a 32-bit memory 200 of arbitrary storage capacity, as may be used to store an instruction set. Memory 200 is comprised of successive rows 201, 202, 203, etc. of four bytes each, with a respective ith row being addressable by means of an associated N bit hexadecimal address code 210-$i$.

In order to step through the instruction set stored in respective rows of the memory, in compliance with its natural boundaries, the processor's program counter will be incremented four bytes at a time, beginning with the address code $0000_{hex}$, which addresses the first row 201 as a four-byte entity encompassing all 32 bits (0–31). To access successive 32 bit words (the next word being that stored in the second row 202), the program counter is incremented to the address code $0004_{hex}$, and so on, through codes $0008_{hex}$, $000C_{hex}$, $0010_{hex}$, etc., each of which has its two least significant bits equal to zero, so as to conform with the natural boundaries of the 32-bit space that defines each row of memory.

In the course of incrementing the program counter, the processor may encounter an instruction that contains an access (read or a write) to a region of memory which overlaps adjacent memory locations (e.g., two consecutive rows for the 32-bit wide memory of the present example). FIG. 3 shows an example of such an unaligned address condition, for a word address to a 32-bit entity 300 (comprised of successive bytes 301, 302, 303 and 304), the first byte 301 of which corresponds to the second byte of row j and the fourth byte 304 of which corresponds to the first byte of adjacent row j+1. FIG. 4 shows a similar overlap situation for half-word address to a 16-bit entity 400 (comprised of bytes 401 402), the first byte 401 of which corresponds to the fourth byte of row j and the second byte 402 of which corresponds to the first byte of adjacent row j+1.

As pointed out above, such boundary-crossing or unaligned memory accesses will occur where a memory address code ends in anything other than 00-binary for a word access, or anything other than 0-binary for a half-word access. In some processing systems, upon the occurrence of such an unaligned access, a fatal error is declared and the system is reset. While a reset may be acceptable in a system that processes archival data, it cannot be tolerated in a digital data communication network, where real time processing and throughput are required.

SUMMARY OF THE INVENTION

In accordance with the present invention, the above-described problem of unaligned accesses to memory are successfully addressed by an address exception handler mechanism, which is effectively operative to perform an on-the-fly replacement of a load/read or write/store instruction that caused an address exception. After completion of this replacement operation, the address exception handler causes the program counter to point to the next instruction that directly follows the exception-causing instruction.

As will be described, during simulation of execution of the instruction that caused the exception, rather than access the actual registers specified in the instruction, the invention accesses an exception stack frame, in which contents of all registers have been saved. By doing so the invention is able to control values that are restored into various registers in the course of the processor executing a general exception vector routine. The address exception handler interfaces data, on a byte-by-byte basis between an unaligned source/destination address and a destination/source register location on the exception stack frame. Once simulated execution of the instruction that caused the general exception has been completed, the address exception handler increments the program counter to the next instruction rather than returning to the previous instruction, making the exception handler effectively a seamless operation.

For an unaligned read/load address exception, the address exception handler accesses the destination register into which the data value contained at the unaligned address is to be loaded. The unaligned address is provided by the MIPS exception routine. The exception program counter is also provided by the MIPS exception architecture. When responding to a load/read exception, the instruction is decoded to determine the destination register and the size and type of the load access. The type applies to half-words only and it can be either signed or unsigned. As will be described, type is used to determine whether the 16-bit half-word should be sign-extended or zero-extended when it is loaded into the destination register.

For a 32-bit data structure, the size of the load access can be either a 32-bit word access or a 16-bit half-word access. Size is used to determine how much data is to be copied from the unaligned address to the destination register. If the load access is a full (32-bit) word, a 'load word' subroutine copies, on a byte-by-byte basis, four sequential bytes from the unaligned address as a replacement for the previously saved contents of the destination register location on the exception stack frame. There is no transfer or copying of these bytes to the actual destination register at this time since, due to the nature of C language programs, the value in the destination register could be destroyed prior to program execution being returned to the origin of the address exception.

Once the saved contents of the destination register location on the exception stack frame have been replaced by the contents at the unaligned address, the exception program counter on the exception stack frame is incremented (by a value of four for a 32-bit memory), so as to cause the exception program counter, when restored by the general exception vector, to point to the next instruction that immediately follows the instruction that caused the exception.

With the address exception handler completed the processor returns to the general exception vector, so that the contents of the registers on the exception stack frame are restored to their associated registers. As a result, the destination register is replaced with the value intended by the instruction that caused the exception, namely, the contents of the unaligned address that has been loaded into the destination register location in the exception stack frame. The program may then proceed as though the unaligned address exception never occurred.

Where a load/read access is a signed half-word, either the value $0x0000_{hex}$ or the value $0xFFFF_{hex}$ is loaded into the upper sixteen bits of the destination register location on the exception stack frame—depending upon whether the most significant bit at the half-word is a '1' or '0'. The two sequential bytes at the unaligned address are copied into the lower sixteen bits of the destination register location on the exception stack frame. The program counter on the exception stack frame is then incremented so that the exception program counter points to the next instruction that immediately follows the instruction that caused the exception.

Where the load access is an unsigned half-word, the value $0x0000_{hex}$ is loaded into the upper sixteen bits of the destination register location on the exception stack frame. The two sequential bytes at the unaligned address are copied into the lower sixteen bits of the destination register location on the exception stack frame. The exception program counter on the exception stack frame is then incremented by a value that causes the exception program to point to the next instruction following the instruction that caused the exception.

In the case of a write or store address exception, for a full word, for a 32-bit field, four sequential bytes are copied from the previously saved source register on the exception stack frame to the unaligned address. The exception program counter on the exception stack frame is then incremented so that the exception program counter points to the next instruction that immediately follows the instruction the caused the exception. For a half-word, the two least significant bytes from the previously saved source register are copied from the previously saved source register on the exception stack frame to the unaligned address.

BRIEF DESCRIPTION OF THE DRAWINGS

FIG. 1 is a reduced complexity diagram of the general architecture of a DSL system;

FIG. 2 shows a reduced complexity diagram of a 32-bit memory;

FIG. 3 shows an example of an unaligned word address condition for the 32-bit memory of FIG. 2;

FIG. 4 shows an example of an unaligned half-word address condition for the 32-bit memory of FIG. 2;

FIG. 5 is a reduced complexity flow chart showing the manner in which exceptions are generally handled by a MIPS architecture;

FIG. 6 shows the manner in which the handle exception step of the general exception vector routine of FIG. 5 is implemented in accordance with the address exception handling methodology of the present invention for a load/read address exception;

FIG. 7 shows the manner in which the handle exception step of the general exception vector routine of FIG. 5 is implemented in accordance with the address exception handling methodology of the present invention for a write/store address exception.

DETAILED DESCRIPTION

Figure 8:
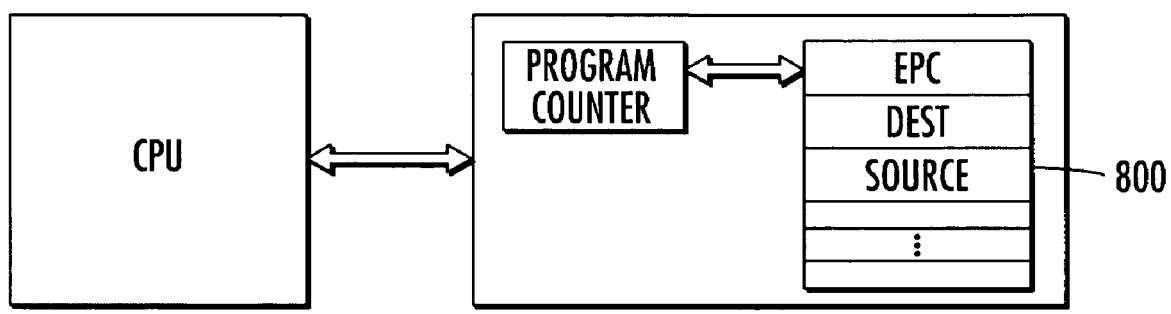
FIG. 8 diagrammatically illustrates an exception stack frame.

Before describing in detail the unaligned memory address exception handling mechanism in accordance with the present invention, it should be observed that the invention resides primarily in what is effectively a prescribed augmentation of data processing control software, as may be employed by a micro-controller within a digital signaling interface unit, such as an integrated access device, referenced above. The digital signaling interface unit itself may typically comprise a modular arrangement of conventional digital communication circuits and associated digital signal processing components and attendant supervisory control circuitry therefor, that controls the operations of such circuits and components. In a practical implementation that facilitates their incorporation into telecommunication equipment, these modular arrangements may be readily implemented as field programmable gate array (FPGA)-implemented, or application specific integrated circuit (ASIC) chip sets.

Consequently, the configuration of these units and the manner in which they are interfaced with other communication equipment have been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram and flow chart illustrations of the Figures are primarily intended to illustrate the major components of the system in convenient functional groupings, whereby the present invention may be more readily understood.

For purposes of providing a non-limiting but illustrative example, the processor may comprise a MIPS-based architecture, which generates an address exception indicative of an unaligned access when one occurs. This architecture also makes available both the contents of the program counter at which the unaligned access occurred the exception program counter (EPC) and the unaligned address itself. As will be described, when invoked, the address exception handler of the present invention effectively replaces a load or store instruction that caused an address exception. After completion of the address exception handler routine, program execution transitions to the next instruction that directly follows the exception-causing instruction. The intended operation of any piece of code is not modified in any way.

In order to facilitate an appreciation of the manner in which the address exception handler routine of the present invention may be effectively seamlessly interfaced with the general exception vector of a MIPS-based architecture, attention is initially directed to FIG. 5, which is a reduced complexity flow chart showing the manner in which exceptions are generally handled by that architecture.

In response to the occurrence of an exception, at an initial step 501, the value of the previous stack pointer is saved and a dedicated portion of memory identified as an exception stack frame (ESF) is prepared. At step 502, the contents and identities of all registers are saved to the exception stack frame. Next, in step 503, the routine transitions to a common C exception handler (which is a general handler for all exceptions). In this subroutine the exact cause of the exception is determined in step 504, the exception itself is handled in step 505, and the subroutine then returns to the general exception vector in step 506. With the exception processed, the contents of the registers, as saved in the exception stack frame, are then restored in step 507 and the value of the stack pointer is restored in step 508. The general exception vector concludes in step 509 by returning to the instruction address in the exception program counter.

As pointed out above, by accessing the exception stack frame during its simulation of execution of the instruction that caused the exception, the address exception handler of the invention is able to control values that are restored into various registers during the processor's execution of the general exception vector. The values restored in step 507 during the general exception vector routine of FIG. 5 are values that will have been replaced by the address exception handler, once program execution is returned to the source of the address exception. Having access to the exception stack frame structure enables the address exception handler to interface data, on a byte-by-byte basis, between an unaligned source/destination register address and a destination/source register location on the exception stack frame. Once simulated execution of the instruction that caused the general exception has been completed, the address exception handler increments the program counter to the next instruction rather than returning to the previous instruction, so that the address exception handler is effectively a seamless operation.

As noted earlier, an unaligned memory access occurs either during a read or load from memory, or during a store or write to memory. The manner in which the unaligned address exception handling routine of the invention handles these two exceptions will be described below with reference to the flow charts of FIGS. 6 and 7, respectively, and the exception register stack frame diagram of FIG. 8.

Load/Read Address Exception (FIG. 6)

FIG. 6 shows the manner in which the 'handle exception' step 505 of the general exception vector routine of FIG. 5, described above, is implemented in accordance with the address exception handling methodology of the invention for an unaligned 'load' address exception.

As described above, and as diagrammatically illustrated in the processor exception register stack frame diagram of FIG. 8, in precursor step 502 of the general exception vector routine of FIG. 5, the contents of all registers are saved in an exception stack frame (ESF) 800. Although, in general, the contents of non-volatile registers do not have to be saved and restored during an exception, in order for the address exception handler of the invention to conveniently have access to all potential destination registers, the contents of all registers, including non-volatile registers, are saved in the ESF.

For a load access exception, the address exception handler must have access to the destination register into which the data value contained at the unaligned memory address is to be loaded. The address exception handler must also know the unaligned address. In addition to providing the unaligned address, the MIPS exception architecture also supplies the contents of the exception program counter.

Referring now to the program flow of FIG. 6, in step 601 the exception program counter is used to identify the instruction (e.g., a 32-bit instruction) that caused the address exception. Next, in step 602, simulated execution of the instruction is initiated by decoding the instruction to determine the destination register and the size and type of the load access. As noted earlier, type applies to half-words only and can be either signed or unsigned. Type is used to determine whether the 16-bit half-word should be sign-extended or zero-extended when it is loaded into the destination register.

For the 32-bit data field of the present example, the size of the load access can be either a 32-bit word access or a 16-bit half-word access. The size is used to determine how much data is to be copied from the unaligned address to the destination register. If the load access is a full (32-bit) word, the routine proceeds to 'load word' step 603. If the load access is a half-word, the routine will transition to either step 611 (in the case of a signed half-word) or step 621 (in the case of an unsigned half-word).

Load/Read Word Subroutine

Assuming that the load access is a full word, the address exception handler proceeds to the 'load word' subroutine of step 603, as described above. In step 604, the load word subroutine then proceeds to copy, on a byte-by-byte basis, the four sequential bytes from the unaligned address as replacement contents for the destination register location on the exception stack frame. There is no transfer or copying of these bytes to the actual destination register at this time since, as pointed out above, the nature of C language programs could cause the value in the destination register to be destroyed before program execution is returned to the origin of the address exception; for this reason, the address exception handler does not simply copy the requisite data into the destination register. Instead, it uses the exception stack frame.

With the destination register location on the exception stack frame having been loaded with the contents at the unaligned address, then in step 605, the subroutine increments the exception program counter on the exception stack by a value that will cause the exception program counter to point to the next instruction that immediately follows the instruction that caused the exception. For the present example of a 32-bit wide memory, the exception program counter is incremented by a value of four (bytes). The 'load word' subroutine then exits to step 506 of the general exception vector routine.

As a result of execution of the 'load word' subroutine, the general exception vector will have been modified to circumvent the exception. First, when the registers restored from the exception stack frame in step 507, the destination register will be loaded with the value intended by the instruction that caused the exception, namely, the contents of the unaligned address that has been loaded into the destination register location in the exception stack frame. Second, with execution of the instruction having been simulated using the exception stack frame, the instruction value in the exception program counter, to which the general exception vector returns in step 509, will be the value that has been restored from the exception stack frame. As pointed out above, its originally saved value has been incremented, so that the exception program counter now points to the next instruction that immediately follows the instruction that caused the exception.

Load/Read Half-Word (Signed)

Where the load access is a signed half-word, the 'load/read' routine transitions from step 602 to the 'load half-word (signed)' subroutine of step 611. In step 612, either $0x0000_{hex}$ or $0FFFF_{hex}$ is loaded into the upper sixteen bits of the destination register location on the exception stack frame, depending upon whether the most significant bit of the half-word is a '1' or '0'. Next, in step 613, the two sequential bytes at the unaligned address are copied into the lower sixteen bits of the destination register location on the exception stack frame. With a complete 32-bit word now loaded into the destination register location, then, in step 614, the subroutine increments the exception program counter on the exception stack frame by a value of four. As was the case with the 'load word' subroutine, this causes the exception program counter to now point to the next instruction that immediately follows the instruction that caused the exception. The subroutine then exits to step 506 of the general exception vector routine.

Load/Read Half-Word (Unsigned)

For a load access that is an unsigned half-word, the 'load/read' routine transitions from step 602 to the 'load half-word (unsigned)' subroutine of step 621. In step 622, the value $0x0000_{hex}$ is loaded into the upper sixteen bits of the destination register location on the exception stack frame. Next, in step 623, the two sequential bytes at the unaligned address are copied into the lower sixteen bits of the destination register location on the exception stack frame. With a complete 32-bit word now loaded into the destination register location, then, in step 624, the subroutine increments the exception program counter on the exception stack frame by a value of four. As was the case with the 'load word' subroutine, and the 'load half-word' (signed) subroutine, this causes the exception program counter to now point to the next instruction that immediately follows the instruction that caused the exception. The routine then exits to step 506 of the general exception vector routine.

Write/Store Address Exception (FIG. 7)

In response to a write or store address exception, the address exception handler must transfer contents of the source register containing the data to an unaligned destination address. As is the case with the load address exception, described above, the unaligned address and exception program counter are provided by the MIPS exception architecture. Referring to the program flow of FIG. 7, in step 701 the EPC is again used to identify the instruction that caused the address exception. Next, in step 702, the instruction is decoded to determine the source register and the size of the store access. As in the case of a load, the size of the store access can be either a 32-bit word access or a 16-bit half-word access. The size is used to determine how much data should be copied from the source register to the unaligned destination address.

As in the case of a load address exception, described above, the requisite data cannot simply be copied from the source register to the unaligned address, while running the address exception handler, since the value in the source register could be destroyed before program execution gets to the address exception handler. For this reason, when handling a write or store address exception, the address exception handler of the invention uses the exception stack frame, so that it can read the register values that were present when the store address exception occurred. Knowing the exception stack frame structure, the address exception handler is able to copy the requisite data from the source register location on the exception stack frame to the unaligned address. Again, as in the case of a load/read exception, the exception stack frame stores the contents of all registers including non-volatile registers.

Store/Write Word

Assuming that the write/store access is a full word, the 'store/write' word subroutine proceeds to the subroutine of step 703, as described above. In step 704, the subroutine proceeds to copy, on a byte-by-byte basis, the four sequential bytes from the source register location on the exception stack frame to the unaligned address. Then, in step 705, the subroutine increments the exception program counter on the exception stack frame by a value that causes the exception program counter to point to the next instruction that immediately follows the instruction that caused the exception. The subroutine then exits to step 506 of the general exception vector routine.

Store/Write Half-Word

If the store/write access is a half-word, the routine transitions from step 702 to the subroutine of step 711. Next, in step 712, the two least significant bytes from the source register location on the exception stack frame are copied to the unaligned address. In step 713, the subroutine then increments the exception program counter on the exception stack frame so that it points to the next instruction that immediately follows the instruction that caused the exception. The subroutine then exits to step 506 of the general exception vector routine.

As will be appreciated from the foregoing description, the above-described problem of unaligned accesses to memory is successfully circumvented by the address exception handler methodology of the present invention, which effectively replaces a load/read or write/store instruction that caused an address exception, by simulating the execution of that instruction with reference to an exception stack frame, to which the contents of all registers at the time of the unaligned address exception have been saved. This allows the invention to control values that are restored into various registers during the processor's execution of the general exception vector. After completion of the routine, program execution transitions to the next instruction that directly follows the exception-causing instruction (which has been effectively performed by the unaligned address exception handler). This makes the invention particularly useful in data communication processing environments, where interruption of data flow (as may be caused by a reset) is to be avoided, and real time processing and throughput are critical.

While I have shown and described an embodiment in accordance with the present invention, it is to be understood that the same is not limited thereto but is susceptible to numerous changes and modifications as known to a person skilled in the art. I therefore do not wish to be limited to the details shown and described herein, but intend to cover all such changes and modifications as are obvious to one of ordinary skill in the art.

What is claimed is:

1. For use with a data processing system, wherein an access to memory must conform with prescribed memory boundary conditions, a method of handling an instruction which contains a memory access code that does not conform with said prescribed memory boundary conditions, comprising the steps of:
   (a) in response to said data processing system generating an exception, resulting from encountering an instruction containing a memory access code that does not conform with said prescribed memory boundary conditions, saving the identification and contents of storage locations referenced in said instruction in a prescribed section of memory, that is exclusive of a storage location thereof identified by contents of said instruction;
   (b) simulating execution of said instruction and, in the course of simulating execution of said instruction, interfacing, with a portion of said prescribed section of memory, contents of storage locations identified by said memory access code that does not conform with said prescribed boundary conditions;
   (c) associating, within said portion of said prescribed section of memory, contents of storage locations, which have been interfaced with said portion of said prescribed section of memory in step (b), with said storage locations identified by said memory access code that does not conform with said prescribed boundary conditions;
   (d) replacing contents of said storage locations referenced in said instruction with information associated therewith stored in said prescribed section of memory; and
   (e) causing said data processing system to proceed to the next instruction immediately succeeding the instruction encountered in step (a), which resulted in said data processing system generating said exception.

2. The method according to claim 1, wherein step (b) comprises, in the course of execution of said instruction, transferring, into said portion of said prescribed section of memory, contents of said storage locations identified by said memory access code that does not conform with said prescribed boundary conditions.

3. The method according to claim 1, wherein step (b) comprises, in the course of execution of said instruction, transferring contents of a portion of said prescribed section of memory into said storage locations identified by said memory access code that does not conform with said prescribed boundary conditions.

4. The method according to claim 1, wherein a respective ith addressable storage location of said memory is N bytes wide, wherein N>1, and wherein said prescribed memory boundary conditions require said memory access code to specify N bytes that do not reside in an addressable storage location other than said ith addressable storage location of said memory.

5. For use with a data processing system, wherein an access to memory must conform with prescribed memory boundary conditions, a method of handling an exception generated as a result of encountering an instruction containing an unaligned memory access code, that does not conform with said prescribed memory boundary conditions, said method comprising the steps of:
   (a) saving contents of all processor registers in an exception stack frame;
   (b) decoding said instruction to identify which processor register is associated with said unaligned memory access code and with which data is to be interfaced;
   (c) interfacing said data with that processor register of said exception stack frame, into which contents of said processor register identified in step (b) were saved in step (a);
   (d) replacing contents of said all processor registers with contents their associated processor registers in said exception stack frame; and
   (e) proceeding to the next instruction following said instruction containing said unaligned memory access code.

6. The method according to claim 5, wherein said exception comprises an unaligned read access exception, and step (c) comprises reading data from an unaligned address.

7. The method according to claim 6, wherein step (c) comprises reading said data on a byte-by-byte basis from said unaligned address.

8. The method according to claim 6, wherein step (c) further includes writing into a destination register location of said exception stack frame said data that has been read from said unaligned address.

9. The method according to claim 8, wherein said data read in step (c) has a size equal to the capacity of said destination register.

10. The method according to claim 8, wherein said data read in step (c) has a size less than the capacity of said destination register, and wherein step (c) further comprises augmenting the size of said data read in step (c) in the course of writing data to said destination register.

11. The method according to claim 10, wherein step (c) includes prepending requisite sign bits to said data in the course of writing said data to said destination register.

12. The method according to claim 5, wherein said exception comprises an unaligned write access exception, and step (c) comprises writing data to an unaligned address.

13. The method according to claim 12, wherein step (c) comprises writing said data on a byte-by-byte basis to said unaligned address.

14. The method according to claim 12, wherein step (c) further includes reading from a source register location on said exception stack frame said data that is to be written to said unaligned address.

15. The method according to claim 14, wherein said data written to said unaligned address has, a size less than the capacity of said unaligned address.

16. The method according to claim 15, wherein step (c) comprises copying the two least significant bytes of said source register location on the exception stack frame to said unaligned address.

17. The method according to claim 5, wherein a respective ith addressable storage location of said memory is N bytes wide, wherein N>1, and wherein said prescribed memory boundary conditions require said memory access code to specify N bytes that do not reside in an addressable storage location other than said ith addressable storage location of said memory.

18. For use with a communication control processor of a data communication system, wherein digital data transported over a communication link is stored and read out of memory, and wherein access to said memory by said communication control processor must conform with prescribed memory boundary conditions, a method of handling an unaligned address exception generated as a result of encountering an instruction containing an unaligned memory access code, that does not conform with said prescribed memory boundary conditions, said method comprising the steps of:
 (a) saving contents of all registers of said communication control processor in an exception stack frame;
 (b) decoding said instruction to identify which register is associated with said unaligned memory access code and with which digital data is to be interfaced;
 (c) interfacing said digital data with a prescribed register of said exception stack frame, said prescribed register saving contents of said processor register identified in step (b);
 (d) restoring contents of said all registers with contents their corresponding registers in said exception stack frame; and
 (e) incrementing a program counter by a value that points to the next instruction following said instruction containing said unaligned memory access code.

19. The method according to claim 18, wherein said exception comprises an unaligned read access exception, and step (c) comprises reading data from an unaligned address.

20. The method according to claim 18, wherein said exception comprises an unaligned write access exception, and step (c) comprises writing data to an unaligned address.

* * * * *